TYPICAL SYSTEM

| FILE TRACK | CHANNEL | |
|---|---|---|
| | FIRST BIT | SECOND BIT |
| F0 | P0 | P8 |
| F1 | D5 | D12 |
| F2 | P1 | D11 |
| F3 | P4 | D15 |
| F4 | P2 | D14 |
| F5 | D7 | D10 |
| F6 | D3 | D13 |
| F7 | D6 | D9 |

INVENTORS
GERRIT A. BLAAUW
STEPHEN W. DUNWELL
BY Melvin P. Williams
ATTORNEY

PARITY ERROR DETECTORS

June 27, 1967 G. A. BLAAUW ETAL 3,328,759

SIMPLIFIED PARTIAL DOUBLE ERROR CORRECTION USING SINGLE ERROR CORRECTING CODE

Filed May 13, 1963 4 Sheets-Sheet 3

June 27, 1967 G. A. BLAAUW ET AL 3,328,759

SIMPLIFIED PARTIAL DOUBLE ERROR CORRECTION USING SINGLE ERROR CORRECTING CODE

Filed May 13, 1963 4 Sheets-Sheet 4

FIG. 11

ERROR CORRECTION CHART

| PARITY ERROR DETECTOR ERROR SIGNALS | ERROR TO BE CORRECTED |
|---|---|
| NO SIGNALS | NO ERROR |
| E0 | P0 |
| E0 E1 | P1 |
| E0 E2 | P2 |
| E0 E1 E2 | D3 |
| E0 E4 | P4 |
| E0 E1 E4 | D5 |
| E0 E2 E4 | D6 |
| E0 E1 E2 E4 | D7 |
| E0 E8 | P8 |
| E0 E1 E8 | D9 |
| E0 E2 E8 | D10 |
| E0 E1 E2 E8 | D11 |
| E0 E4 E8 | D12 |
| E0 E1 E4 E8 | D13 |
| E0 E2 E4 E8 | D14 |
| E0 E1 E2 E4 E8 | D15 |
| E1 | UNCORRECTABLE |
| ⋮ | ⋮ |
| E1 E2 E4 | UNCORRECTABLE |
| E8 | P0 P8 0 |
| E1 E8 | D5 D12 4 |
| E2 E8 | P1 D11 3 |
| E1 E2 E8 | P4 D15 7 |
| E4 E8 | P2 D14 6 |
| E1 E4 E8 | D7 D10 2 |
| E2 E4 E8 | D3 D13 5 |
| E1 E2 E4 E8 | D6 D9 1 |

FIG. 9

| | SINGLE ERROR E0=1 |
|---|---|
| LOW ORDER ERROR E8=0 | A1=E1<br>A2=E2<br>A4=E4<br>B1=0<br>B2=0<br>B4=0 |
| HIGH ORDER ERROR E8=1 | A1=0<br>A2=0<br>A4=0<br>B1=E1<br>B2=E2<br>B4=E4 |

FIG. 10

| | DOUBLE ERROR E0=0 |
|---|---|
| UNCORRECTABLE E8=0 | A1=0<br>A2=0<br>A4=0<br>B1=0<br>B2=0<br>B4=0 |
| CORRECTABLE E8=1 | A1=E1⊻E2<br>A2=E4<br>A4=E1<br>B1=E2<br>B2=E2⊻E4<br>B4=E1⊻E4 |

United States Patent Office 3,328,759
Patented June 27, 1967

3,328,759

SIMPLIFIED PARTIAL DOUBLE ERROR CORRECTION USING SINGLE ERROR CORRECTING CODE

Gerrit A. Blaauw and Stephen W. Dunwell, Poughkeepsie, N.Y., assignors to International Business Machines Corporation, New York, N.Y., a corporation of New York
Filed May 13, 1963, Ser. No. 279,706
7 Claims. (Cl. 340—146.1)

This invention relates to data processing error correction, and more particularly to a device which achieves full single error correction and partial double error correction using simple logical circuits and a single error correcting code.

CONTENTS

| | Column |
|---|---|
| Prior Art | 1 |
| Objects | 2 |
| Brief Description of Invention | 2 |
| Description of the Drawings | 2 |
| Introductory Definitions | 3 |
| Typical System—FIG. 1 (Sheet 1) | 3 |
| File Track—Channel Relationship FIG. 2 (Sheet 1). | |
| Error Correction Chart—FIG. 11 (Sheet 4). | |
| Parity Error Detectors—FIGS. 3–7 (Sheet 2) | 5 |
| Error Correction Address Generator—FIG. 8 (Sheet 3) | 6 |
| Single Error Address Chart—FIG. 9 (Sheet 4). | |
| Double Error Address Chart—FIG. 10 (Sheet 4). | |

*Prior art*

In the data processing art, it is well-known that data may be encoded in such a fashion that single errors (such as a single bit dropout) may be corrected, and double errors detected. One code which achieves single error correction and double error detection is the well-known Hamming code. In this code, a plurality of parity bits and a larger plurality of data bits are provided, and each of the parity bits is associated with a different combination of the data bits. Thus, whenever a single error occurs, an examination of the resulting parity bits will show which data bit was in error. In this manner, it is possible to reverse the condition of the data bit which is determined to be in error. The code also shows, by means of the parity bits, when an error involves two data bits (a double error).

Actually, the Hamming code detects odd errors and identifies a single data bit which could cause the odd error, and also detects even errors, which are usually assumed to be double errors. Many analyses have been performed on the validity of the assumption that the error is either a single error or double error, as the case may be, rather than some other multiple error (such as three or four bits in error); these show that the assumption is quite reliable in most cases.

It is well-known in the prior art that single and double error correcting codes can be achieved by further complicating the code, and it may be assumed that even greater multiples of errors may be corrected by use of a suitably expanded code. However, it has been found to be uneconomical, in terms of the ratio of parity bits to data bits, to use more than a single error correcting code in most cases.

In order to expand error correcting capability without unduly complicating the code used, at least one prior art device has provided for correction of certain double errors by use of a single error correcting, double error detecting code. In this device, it is assumed that any double error results from two bits which are adjacent to one another. This is a valid assumption in many cases due to the fact that if one bit is in error, a bit preceding or anteceding it is most likely to be in error as well. One example of such a case is found in magnetic tapes, where a bit dropout is frequently caused by some impurity on the tape, or imperfection within the tape. In such a case, the chances are high that more than one bit will be lost in the impurity or imperfection. However, the double adjacent error correction device known in the prior art requires the use of a shift register, which not only complicates the apparatus, but requires a significant period of time (in comparison with the repetition rate of the data at the main operating frequency of the data processing apparatus) in order to shift the data through the register so as to operate on it and thereby achieve double adjacent error correction.

*Objects*

It is therefore a primary object of the invention to provide an improved double error correction device utilizing a single error correcting code.

Other objects include:

Provision of double error correcting apparatus which avoids the use of shift registers;

Provision of double error correcting apparatus which can correct certain double errors substantially within a single cycle of machine time;

Provision of double error correcting apparatus which may be implemented with simple logic circuits;

Provision of a simplified circuit for achieving partial double error correction with a single error correcting code.

*Brief description of invention*

This invention is predicated on the concept that it is valid to assume, in a data processing machine, that all even-numbered errors are caused by certain double errors which the physical characteristics of the machine are most likely to cause.

In accordance with the present invention, all even-numbered errors which are detected are presumed to be double errors, and the double errors are so handled that, out of a pair of possible double errors, one is chosen as the presumed error in every case. The bits in the error correcting circuitry are so related to bits in the data generating portions of the data processing apparatus as to make this presumption valid in any given application, or at least as valid as the "odd-equals-single" presumption which is made in using the Hamming code.

The invention avoids the necessity of using a shift register, which unduly complicates the hardware of a system, and which inherently requires a greater number of machine cycles in which to shift data through the shift register in order to achieve the double error correction which was heretofore obtainable with a single error correcting code. The invention also provides economical means for checking certain adjacent double errors, without utilizing equipment capable of checking all double adjacent errors, and thereby optimizes the economy of the circuit.

The foregoing and other objects, features and advantages of the invention will be apparent from the following more particular description of a preferred embodiment thereof, as illustrated in the accompanying drawings.

*Description of the drawings*

FIG. 9 is a chart showing single error addresses in accordance with the present invention;

FIG. 10 is a chart showing double error addresses in accordance with the present invention;

FIG. 11 is a chart showing ultimate addresses of bits to be corrected in accordance with the present invention.

*Introductory definitions*

In order to simplify the ensuing description, as well as to provide the basis for simplified language in the claims, certain terminology and symbolism, which are believed to be widely used in the electronic data processing art, will be set forth.

Although it is possible to use the teachings of the present invention in many different environments, maximum utility is believed to be obtainable in apparatus similar to the preferred embodiment, which comprises binary electronic data processing equipment. In such equipment, it is common for intelligible data to be represented by the selective presence or absence of signals having different data significance. In a parallel machine, of which the preferred embodiment is an example, the spacial position of an electrical signal determines its data value. For instance, each line of a data channel may represent successive powers of two in the binary number system. These therefore would represent decimal values of 0, 1, 2, 4, 8, etc., as is well-known in the art. Those lines in the channel which represent lower powers of two in the binary system or lower numbers in the decimal system may be called lower ordered channels, and signals representative of intelligence thereon may be referred to as lower ordered data bits.

The construction of a manifestation of intelligence in such a system is the concurrent presence and absence of signals on the various lines of a channel, or at the input to amplifiers, or stored in bistable devices. Thus, the entire group of signals may be considered to be a message, a word, or a character, or it may be given any other group designation. Each signal within the group may be considered to be a data bit. The intelligence may be identified by the presence or absence of a bit, or by considering the bit to be ONE or ZERO, respectively. Or, as is more prevalent in modern computer technology, to be considered as the bit or complement thereof. Thus, in a data channel in the present embodiment, the presence or absence of a signal may be referred to as PO or $\overline{\text{PO}}$, the "P" merely designating "binary parity bit"; similarly, another signal may be referred to as D3 or $\overline{\text{D3}}$, the "D" merely designating "binary data bit." The D3 bit may be considered to be a ONE and the $\overline{\text{D3}}$ bit may be considered to be a ZERO.

*Typical system*

Figures 1, 2:
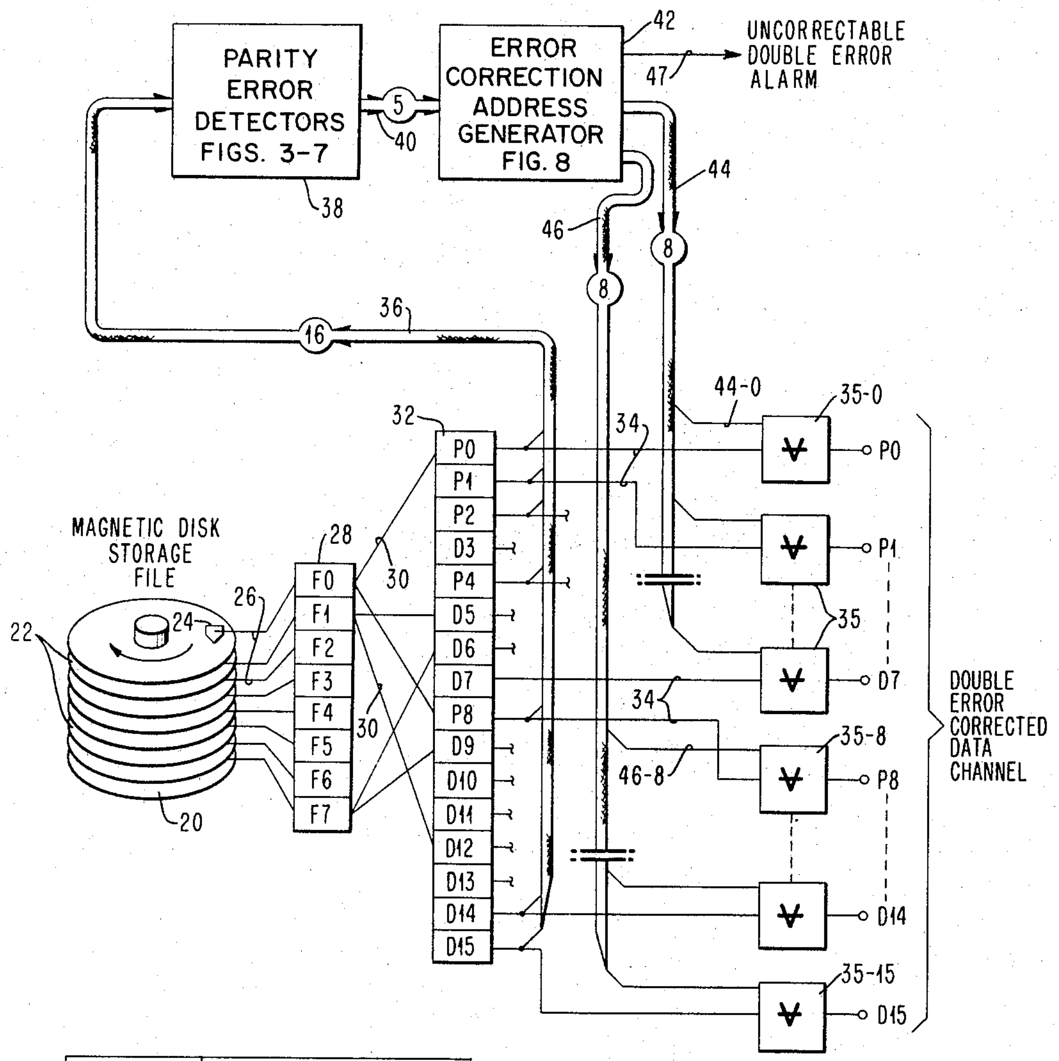
FIG. 1 is a schematic block diagram of a typical system which can correct certain double adjacent errors with a single error correcting code, in accordance with the present invention.
FIG. 2 is a chart illustrating the relationship between adjacent data bits on a magnetic disk storage file track and the bits of a single error correcting code in a data channel of the data system shown in FIG. 1.

Referring now to FIG. 1, the subject invention is shown, by way of example, in a typical system in which an eight channel MAGNETIC DISK STORAGE FILE 20 supplies data manifestations to a sixteen channel data processing system. The magnetic disk storage file 20 has a plurality of disks 22, each of which comprises a magnetic surface having at least one track for magnetically manifesting information in the form of data bits, all as is well-known in the art. The disks 22 are hereinafter referred to as "tracks," since each of these represents an independent source of data, or a "track," insofar as environmental description of this invention is concerned. Each of the tracks 22 has a magnetic head 24 associated therewith for sensing the magnetic manifestations of data on the tracks. Each head 24 is connected by a respectively corresponding line 26 to a related portion of a disk file output channel 28, shown in FIG. 1 as blocks F0–F7. Each part F0–F7 of the disk file output channel 28 may comprise the necessary amplifiers, shapers, power boosters, timing and other logical circuits so as to read data on the disk file and provide electrical signals responsive thereto on respectively corresponding lines 30 for transmission to a system input channel 32. The relationship between the file tracks 22 and the respective positions of the system input channel 32 are shown in the chart in FIG. 2, and are represented by lines 30 drawn for tracks F0, F1, and F7 (the other lines being omitted for clarity). Thus, data is read from the disk file in two steps, a first group of eight data bits passing through the eight bit disk file output channel 28 into preassigned bit positions of the system input channel 32 at a first time, and another eight bits of data passing through the disk file output channel 28 into the remaining bit positions of the system input channel 32 at a subsequent time. For instance, at a first time file track F0 will read bit P0 (which stands for "parity bit in the zero position of the channel"), and at a subsequent time will read P8 ("which stands for parity bit for the eighth bit position" of the system data channel).

Each of the positions of the system input channel 32 is connected by a corresponding line 34 to a related EXCLUSIVE OR circuit 35, the purpose of which is to correct any errors which may be apparent on the line 34, as described in detail hereinafter. The various positions of the system input channel 32 are also connected to corresponding lines in a trunk of sixteen lines 36 for transmission to PARITY ERROR DETECTORS 38, which are shown in detail in FIGS. 3–7 and described hereinafter. Within the PARITY ERROR DETECTORS 38, the parity bits are examined to determine whether or not there is an error associated with each bit. For any parity bit which indicates a correctible error, a corresponding error bit is generated and transmitted over a trunk of five lines 40 to an ERROR CORRECTION ADDRESS GENERATOR 42 which is shown in detail in FIG. 8 and described hereinafter. The ERROR CORRECTION ADDRESS GENERATOR 42 generates error correcting signals for transmission to the low order bits over a trunk of eight lines 44 and to the high order bits over a trunk of eight lines 46. These lines are combined in the EXCLUSIVE OR circuits 35 in a manner such that if an error correction signal appears on one of the lines 44, 46 it will cause the data on the related one of the lines 34 to be changed from ONE to ZERO or from ZERO to ONE, respectively, so as to correct any single or correctible double error which may occur in the system.

Referring again to FIG. 2, the errors which are taken as double errors, and which are corrected whenever a double error is indicated, are shown in pairs with the associated file track. Thus, in the typical system exemplifying use of this invention, the double errors are assumed to occur in the bits which come from the same file track. This is a valid assumption as in the case of adjacent errors coming from a tape or other input-output device. However, it is to be noted, that the data bits which are corrected as a pair are not adjacent within the system input channel 32. In this respect, this device differs from double adjacent error correction devices known to the prior art. It is the use of non-adjacent bits within the channel which permits partial double error correction with relatively fast logical circuits only, not requiring the need of any form of register or other shifting device.

Whenever a single error is indicated, the parity bit which causes generation of an error bit (as illustrated in FIGS. 3–7 and to be described hereinafter), the bit in error is found in the bit position which is the decimal equivalent of the binary value of the error signal generated. Thus, if the second and fourth parity bits P2, P4 each generate a corresponding error bit E2, E4 (as described with reference to FIGS. 3–7 hereinafter), then the bit in error is in the sixth bit position D6. This is illustrated in the error correction chart of FIG. 11 (Sheet 4), the upper portion of which will be recognized as the definition of the well-known Hamming code.

From the chart it can be seen that all *single* errors are identified by the E0 bit, the decimal value of the binary error bits giving the address of the parity or data bit which is in error. Any combination of error signals which do not include either the E0 or E8 error signals are caused by double errors which are uncorrectible, and are therefore cast out and not recognized. Any errors which are identified by the lack of E0 and the presence of E8 are correctible double errors as shown.

Referring to the bottom of the chart of FIG. 9 and to the chart of FIG. 2, it will be apparent that, disregarding the E8 bit, the error bits are a binary representation of the decimal number of the file track which contains the pair found to be in error. For instance, error bits E1 and E2, together with the double error indicating bit E8, designate error in parity bit P4 and data bit D15, which are found on track F3; the total decimal value of E1 and E2 being three.

*Parity error detectors*

In the subject embodiment, parity has been chosen as being correct when the total number of data and parity bits is an even number. In this situation, there should be no output from an EXCLUSIVE OR tree of the type shown ni FIGS. 3–7.

Figures 3, 4, 5, 6, 7:
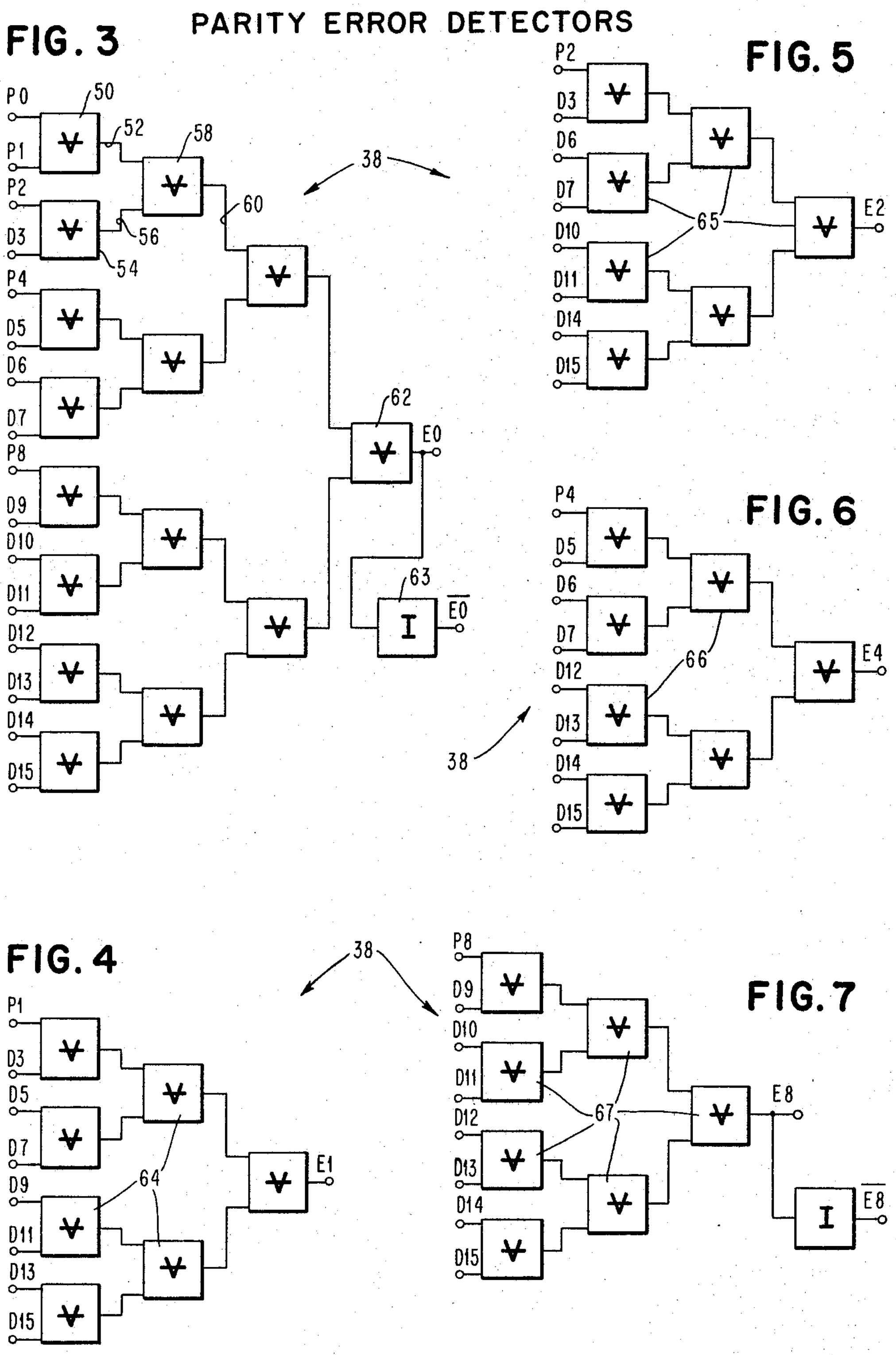
FIGS. 3–7 are schematic block diagrams of EXCLUSIVE OR "trees" for generating error bits in accordance with the well-known single error correcting double error detecting Hamming code.

Referring now to FIG. 3, the entire system input channel 32 is monitored to determine whether or not the parity bit P0 is correct. In order for P0 to be correct, it must comprise a one bit if the remaining bits P1–P15 comprise an odd number of bits, and conversely, P0 must be a zero (or absent) (or one could say there must be no P0) if the total number of bits P1–P15 is an even number. All of this is accomplished by the inherent operation of the EXCLUSIVE OR circuits. For instance, a first EXCLUSIVE OR circuit 50 will generate an output signal on a line 52 if either one, but not both, of the inputs P0, P1 are present. If neither of the inputs are present, or if both of the inputs are present, there will be no output signal on the line 52. In other words a signal on line 52 indicates an odd number of bits as between the bits P0 and P1. Similarly, an EXCLUSIVE OR circuit 54 will generate an output signal on a line 56 if either one, but not both, of the inputs P2, D3 are present. Thus a signal on line 56 also indicates an odd number of bits present at the input to the EXCLUSIVE OR circuit 54. The lines 52, 56 are applied to another EXCLUSIVE OR circuit 58 which will generate a signal on a line 60 if there is either one, but not both, signals present at its input. Therefore, a signal on line 60 indicates that there is an odd number of signals present as between signals P0, P1, P2 and D3. In a similar fashion, all the remaining EXCLUSIVE OR circuits in FIG. 3 will generate an output signal whenever the total number of inputs to which that particular EXCLUSIVE OR circuit responds is an odd number. Thus, an error signal E0 out of the EXCLUSIVE OR circuit 62 will indicate that there is an odd number of bits in the total input channel 32. Since parity has been chosen so that the total number of bits should be even, this indicates an error in the parity bit P0. By way of illustration, an inverter circuit 63 has been shown to generate the complement of the zero error signal E0, which signal is designated $\overline{\text{E0}}$. Of course, it should be understood by those skilled in the art, that many suitable EXCLUSIVE OR circuits are available in the art which will provide complementary outputs without the need of additional, external inverters such as inverter 63. All that is significant here is that, in the remaining circuits described hereinafter, it has been found desirable to have not only the error signal, but the complement thereto as well, in order to most expeditiously perform the functions of the various circuits.

The correctness of the parity bit P1 is determined by FIG. 4. FIG. 4 is a tree of EXCLUSIVE OR circuits 64, which monitors only those bits of the data channel 32 which are associated with the parity bit P1. Thus it can be seen that all the odd-numbered bits in the data channel are associated with the parity bit P1. If there is an odd number of bits present among all of the odd-numbered bits (as shown in FIG. 4), then the parity bit P1 is in error, since all of these bits together with the parity bit P1 should equal an even number. Since the error signal E1 output of the EXCLUSIVE OR tree will be present only when there is an odd number of inputs to the circuit of FIG. 4, E1 correctly designates an error in parity bit P1.

Referring briefly to the error correction chart of FIG. 11, it can be seen that the parity error detector error signals include error signal E2 for the following single errors . . . P2, D3, D6, D7, D10, D11, D14, D15. In FIG. 5, the same bits are seen to comprise the input to a tree of EXCLUSIVE OR circuits 65, which determines the correctness of parity bit P2, and if it finds parity bit P2 in error, generates an error signal E2 in the same fashion as described with reference to FIG. 3.

Referring again to the error correction chart of FIG. 11, it can be seen that error bit E4 is present among the error detector error signals which indicate errors in the following bits: P4, D5, D6, D7, D12, D13, D14, D15. These same bits comprise the inputs to the tree of EXCLUSIVE OR circuits 66 shown in FIG. 6, which will generate an error signal E4 whenever there is an odd number of said bits present at the input thereto, in the same fashion as described with reference to FIG. 3, hereinbefore.

FIG. 11 illustrates that the parity bit E8 is utilized as an indication of error in the last half of the code, that is, for all of the bits from P8 through D15. These bits comprise the inputs to the tree of EXCLUSIVE OR circuits 67 shown in FIG. 7, which generates an error signal E8 indicating that the parity bit P8 is in error whenever there is a total number of odd bits at the input of FIG. 7. The complement of error signal E8 ($\overline{\text{E8}}$) is generated in the same fashion as described with reference to FIG. 3 hereinbefore.

Thus it can be seen that by comparity the parity bit and all of the data bits associated therewith in EXCLUSIVE OR trees, it is possible to generate an error signal respectively corresponding to each of the parity bits. It is a comparison of the combination of these error signals in accordance with the error correction chart shown in FIG. 11 which indicates which bit (in the case of single errors) or bits (in the case of double errors) are in error.

*Error correction address generator*

Figure 8:
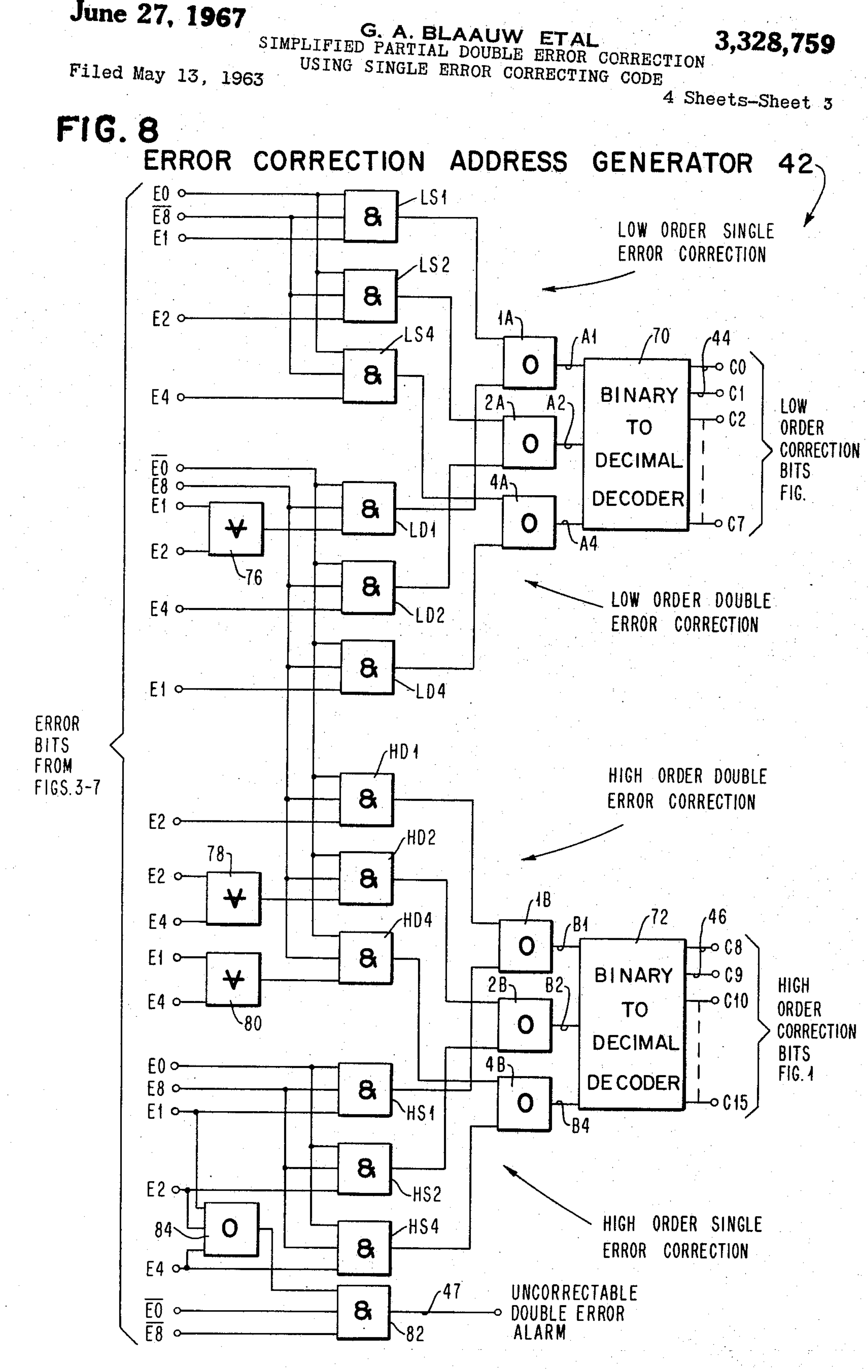
FIG. 8 is a schematic block diagram of an error correction address generator for determining the address of single and double errors in the typical system shown in FIG. 1, in accordance with the present invention.

In FIG. 8 is shown the ERROR CORRECTION ADDRESS GENERATOR 42 which responds to combinations of all of the error signals from FIGS. 3–7 in order to generate LOW ORDER CORRECTION BITS C0–C7 on the trunk of eight lines 44 and HIGH ORDER CORRECTION BITS C8–C15 on the trunk of eight lines 46. These bits C0–C15 are applied directly to the EXCLUSIVE OR circuits 35, shown in FIG. 1. Thus the correction bit C0 will be applied by a line 44–0 to EXCLUSIVE OR circuit 35–0, and will reverse the state of the parity bit P0 whenever the parity bit P0 is found to be in error. Similarly, the high order correction bit C8 will be applied over a line 46–8 to EXCLUSIVE OR circuit 35–8 for correcting parity bit P8, and correction bit C15 is utilized in EXCLUSIVE OR circuit 35–15 in order to correct data bit D15. The operation of the ERROR CORRECTION ADDRESS GENERATOR shown in FIG. 8 is illustrated in FIG. 9 and FIG. 10. FIG. 9 shows the low order and high order binary address bits (A1–A4, B1–B4, respectively) which become the correction bits C0–C15 after being decoded from binary into decimal form. As can be seen with reference to the upper portion of FIG. 11, the single errors indicated in FIG. 9 are characterized by the fact that the decimal equivalent of the binary value of the sum total of the error signals indicates the bit which is in error, thus, if error signals E0, E1, E2, and E4 are present at the input to FIG. 8, this indicates that data bit D7 is in error and must be corrected. In order to correct data bit D7, a low order correction bit C7 must be applied to the respectively corresponding one of the EXCLUSIVE OR circuits 35 (FIG. 1).

The essential elements of the error correction address generator in FIG. 8 are a plurality of AND circuits (&). These are arranged in groups in accordance with the function they perform. Thus the top three AND circuits LS1, LS2, LS4 generate address bits A1, A2, A4 for low order single error correction. The next group of AND circuits LD1, LD2, LD4 generate address bits for low order double error correction. The next to the bottom group of AND circuits HD1, HD2, HD4 generate address bits B1, B2, B4 for high order double error correction, and the the last group of three AND circuits HS1, HS2, HS4 generate address bits for high order single error correction.

Referring to the AND circuits LS1, LS2, LS4, in the chart of FIG. 9, a low order error, that is, an error which occurs somewhere within the bits P0–D7 is also accompanied by the lack of an error bit E8; in other words, there is always present a $\overline{E8}$ error bit. Also, there is always error in the parity bit P0, and error bit E0 must always be present when correcting single errors. At the upper left of FIG. 8, it can be seen that two of three inputs to all three AND circuits LS1, LS2, LS4 comprise E0 and $\overline{E8}$. AND circuit LS1 will provide an output to an OR circuit 1A whenever there is E0, $\overline{E8}$ and E1 error bits present. AND circuit LS2 will provide an output to an OR circuit 2A whenever the E0, $\overline{E8}$ and E2 bits are present. Similarly, AND circuit LS4 will provide an output to an OR circuit 4A whenever the error bits E0, $\overline{E8}$ and E4 are present. The OR circuits 1A, 2A, 4A generate binary coded error correction address bits on lines A1, A2, A4 respectively. These are fed to a BINARY TO DECIMAL ENCODER 70 for conversion from pure binary to pure decimal form so as to represent a correct single one of the various LOW ORDER CORRECTION BITS C0–C7 on the trunk of eight lines 44. If E0 is present, and E8 is also present, this indicates, as may be seen with reference to FIG. 9 and FIG. 11, that there is a single error in one of the high order bits, that is, a single error somewhere between bits P8 and D15 in the data channel 32. Thus, the high order single error correction AND circuits HS1, HS2, HS4 each respond to the presence of error bits E0 and E8, and respond to respectively corresponding error signals E1, E2, E4 so as to supply signals to corresponding OR circuits 1B, 2B, 4B, as hereinbefore described with respect to low order single error correction. The OR circuits 1B, 2B, 4B generate respectively corresponding binary coded error correction address signals on lines B1, B2, and B4, which are converted into decimal form by another binary to decimal decoder 72 so as to provide, in decimal form, the HIGH ORDER CORRECTION BITS C8–C15 on the trunk of eight lines 46.

Referring to the bottom portion of FIG. 11 and to FIG. 10, it can be seen that all double errors are accompanied by the lack of an error bit E0, or, by the presence of the $\overline{E0}$ bit. It will also be seen that all correctible double errors are accompanied by the presence of an E8 bit. Thus, all of the low order double error correction AND circuits LD1, LD2, LD4 as well as the high order double error correction AND circuits HD1, HD2, HD4 respond to the presence of a $\overline{E0}$ error bit and an E8 error bit. These AND circuits also respond to signals in accordance with the bottom half of FIG. 10: in other words, AND circuit LD1 will generate a signal or not in dependence upon whether the EXCLUSIVE OR function of E1 and E2 is a ONE. If it is a ONE, AND circuit LD1 will supply a signal to OR circuit 1A so as to generate a binary error correction address signal A1. On the other hand, if the EXCLUSIVE OR function of E1 and E2 equals ZERO, there will be no output from the AND circuit LD1. This functional operation is achieved by error signals E1 and E2 being applied to an EXCLUSIVE OR circuit 76, the output of which is applied to AND circuit LD1. In a similar fashion, as can be seen with respect to FIG. 10, the low order double error correction binary address bit A2 is always equal to error bit E4. In other words, if there is an error bit E4, then the address must include binary address bit A2. The same is true with the AND circuit LD4 which will generate address bit A4 in response to error bit E1. The AND circuits HD1, HD2, HD4 respond in a similar fashion to error signals E2, and EXCLUSIVE OR circuits 78 and 80, respectively.

The choice of values for the binary address bits A1, A2, A4 and B1, B2, B4 are determined by the inherent nature of the Hamming code, in combination with the assignment of disk file tracks F0–F7 (FIG. 1) to the various tracks of the input data channel 32. Furthermore, it is to be noted that all double errors include a single error in the low order group together with a single error in the high order group. Therefore, specification of a combination of A bits and a combination of B bits will uniquely define one pair of errors. For instance, assume that the double error includes data bit D5 and data bit D12: it is necessary that A bits total 5 and that the B bits total 4 (since the high order correction bits C8–C15 each have a numerical designation which is eight bits higher than the decimal value of the binary address bits B1, B2, B4 from which the C bits are decoded). Since this is a double correctible error, E8 and E0 are present. The only other error bit is E1; E2 and E4 are ZERO's. A1 is equal to E1 EXCLUSIVE OR'd with E2, E2 being ZERO. A1 will equal ONE. A4 equals E1, so A4 is also ONE. Thus the A bits will include bits A1 and A4, which together equal a total value of 5, thereby causing the binary to decimal decoder 70 to generate a signal on line C5 (not shown in FIG. 8). Similarly, the B4 bit equals E1 EXCLUSIVE OR'd with E4, and therefore B4 is ONE. The B1 bit equals E2, which is ZERO; the B2 bit equals E2 EXCLUSIVE OR'd with E4, each of which (and therefore the EXCLUSIVE OR of which) is ZERO.

Other combinations of double errors, and solutions to the problem of what the A and B bits ought to be (under various combinations of error bits), could be devised, it being immaterial which ones are used in the subject invention. The example shown was chosen as illustrative merely, other examples being well within the scope of the present invention.

Referring again to the AND circuits LD1, LD2, LD4, HD1, HD2, HD4 and the bottom of FIG. 10, it can be seen that these AND circuits merely sense the presence of $\overline{E0}$ and E8, and otherwise perform the function for generating the various A and B bits, as shown in the bottom half of FIG. 10, all in an obvious manner.

In order to account for the presence of an uncorrectible double error, an AND circuit 82 and an OR circuit 84 are provided (bottom of FIG. 8), which responds to concurrent error bits $\overline{E0}$ and $\overline{E8}$ and any one of E1, E2 or E4 to generate the uncorrectible double error alarm on line 47. This alarm may be utilized to turn off the machine, to register the fact that an error has occurred, or in any other manner known to the prior art.

While the invention has been particularly shown and described with reference to a preferred embodiment thereof, it will be understood by those skilled in the art that various changes in form and details may be made therein without departing from the spirit and scope of the invention.

What is claimed is:

1. In a data processing machine of the type having a data channel for simultaneous transmission of a plurality of data designating manifestations, referred to hereinafter as a word of bits, said word including data bits and parity bits arranged in an ordered sequence in accordance with the well-known Hamming code, said word being arranged in two groups, a first group containing low order bits and the second group containing high order bits, a device for correcting certain double errors, comprising:

detector means for checking each parity bit and for generating a respectively corresponding error signal when the related parity bit includes an error;

and double error identification means operative in response to the absence of a first error signal concurrently with the presence of a second error signal to generate double error bit identification signals indicative of a pair of data bits which are presumed to be in error, said signals being selectively different in dependence upon the presence of other ones of said error signals, each of said double error bit identification signals including an address respectively corresponding to a bit in each of said groups, said first error signal being generated in response to said detector means detecting error in the parity bit related to the entire word, said second error signal being generated in response to said detector means detecting error in the parity bit related to said second group.

2. The device described in claim 1 additionally comprising:

single error identification means responsive to said first error signal for producing single error bit identification signals definitive of a single bit which is in error in accordance with the well-known Hamming technique.

3. The device described in claim 1 additionally comprising:

means responsive to the concurrent absence of said first error signal and said second error signal and the simultaneous presence of at least one other of said error signals, to generate an alarm signal indicative of an uncorrectable double error.

4. The device described in claim 1 wherein said low order group contains eight bits numbered 0–7 and said high order group contains eight bits numbered 8–15, and wherein said double error means generates address signals for said low order group comprising a combination of three binary signals A1, A2, A4 and generates address signals for said high order group containing a combination of three binary signals B1, B2, B4, each of said signals having a binary value equal to the numerical portion of its designation, wherein said detecting means generates error signals E0, E1, E2, E4 and E8, each respectively corresponding to one of the Hamming code parity bits 0, 1, 2, 4, and 8, said first error signal being E0, said second error signal being E8, and wherein said double error identification means generates addresses in accordance with the following relationships:

A1=E1 EXCLUSIVE OR E2
A2=E4
A4=E1
B1=E2
B2=E2 EXCLUSIVE OR E4
B4=E1 EXCLUSIVE OR E4

5. The device described in claim 1 wherein said double error identification means comprises:

a first EXCLUSIVE OR circuit responsive to third and fourth ones of said error signals, a second EXCLUSIVE OR circuit responsive to said fourth and a fifth one of said error signals, and a third EXCLUSIVE OR circuit responsive to said third and said fifth error signals;

a plurality of first AND circuits corresponding to said low order group, a first one responding to said first EXCLUSIVE OR circuit, a second one responding to said fifth error signal, and a third one responsive to said third error signal;

and a plurality of second AND circuits corresponding to said high order group, a first one responsive to said fourth error signal, a second one responsive to said second EXCLUSIVE OR circuit and a third one responsive to said third EXCLUSIVE OR circuit.

6. In an information system employing equal length permutation code groups in which element values are characterized by one or the other of two possible signaling conditions, the improvement which comprises:

means for encoding information into single error-correcting plus double error-detecting code groups in which each of said single error-correcting plus double error-detecting code groups has element values differing from the element values of each of the other of said single error-correcting plus double error-detecting code groups in four or more element positions in a respective element position comparison of each of said single error-correcting plus double error-detecting code groups;

means for designating pairs of element positions which will be recognized as errors for any double error which results in the same change in said single error-correcting plus double error-detecting code groups, each pair including one element position in the lower-valued half of said groups and one element position in the higher-valued half of said code groups;

means for changing the value in any two of the element positions of each of said single error-correcting plus double error-detecting code groups so that the said element value difference created by said encoding means is maintained if only one of said designated pairs of element errors occurs in each of said single error-correcting plus doube error-detecting code groups;

and means for detecting two or less possible element value errors in each of said single error-correcting plus double error-detecting code groups.

7. The device described in claim 6 additionally comprising:

means for changing the value in any one of the element positions of each of said single error-correcting plus double error-detecting code groups so that the said element value difference created by the said encoding means is maintained if no more than a single element error occurs in each of said single error-correcting plus double error-detecting code groups.

References Cited

UNITED STATES PATENTS

| | | | |
|---|---|---|---|
| Re. 23,601 | 12/1952 | Hamming et al. | 340—146.1 |
| 3,163,848 | 12/1964 | Abramson | 340—146.1 |
| 3,209,327 | 9/1965 | Brandt | 340—146.1 |
| 3,213,426 | 10/1965 | Melas | 340—146.1 |
| 3,218,612 | 11/1965 | Sorg et al. | 340—146.1 |
| 3,222,644 | 12/1965 | Burton et al. | 340—146.1 |

MALCOLM A. MORRISON, *Primary Examiner.*

M. P. ALLEN, M. J. SPIVAK, *Assistant Examiners.*